United States Patent [19]

Pace

[11] 3,991,032

[45] Nov. 9, 1976

[54] WATER-BASED, WATER INSOLUBLE PRINTING INKS

[75] Inventor: Henry A. Pace, Akron, Ohio

[73] Assignee: The Goodyear Tire & Rubber Company, Akron, Ohio

[22] Filed: Mar. 24, 1975

[21] Appl. No.: 561,124

[52] U.S. Cl. .................. 260/29.7 H; 260/29.6 H; 260/29.6 HN; 260/29.6 N; 260/29.6 E; 260/29.7 NE
[51] Int. Cl.² ........................................ C08L 47/00
[58] Field of Search .............. 260/29.6 HN, 29.6 H, 260/29.6 N, 29.6 E, 29.7 H, 29.7 NE

[56] References Cited
UNITED STATES PATENTS

| | | |
|---|---|---|
| 2,930,775 | 3/1960 | Fordyce et al. ............... 260/29.7 H |
| 3,349,055 | 10/1967 | Taguchi ..................... 260/29.6 HN |
| 3,687,887 | 8/1972 | Zabiak ......................... 260/29.6 E |
| 3,766,116 | 10/1973 | Olhoft ....................... 260/29.6 HN |

OTHER PUBLICATIONS

Chemical Abstracts, vol. 77, 1972, p. 6098z.

*Primary Examiner*—M. J. Welsh
*Attorney, Agent, or Firm*—F. W. Brunner; J. Y. Clowney

[57] ABSTRACT

A water-based ink comprising a solution of the ammonium salt of olefin/maleic anhydride or polyolefin/maleic anhydride copolymers in a water/diol solution together with a coloring material to form an ink which becomes irreversibly impervious to water when dry.

7 Claims, No Drawings

WATER-BASED, WATER INSOLUBLE PRINTING INKS

The present invention relates to printing inks. More specifically, the present invention relates to water-based printing inks which become irreversibly impervious to water when dry.

Heretofore inks used in the printing industry have been either water-based which were reversibly soluble in water and tended to smear under conditions of moisture, or were based on petroleum hydrocarbon solvents which upon volatilization left the imprint resistant to smudges from water-moist objects. Such solvent-based inks required enormous amounts of solvents with the attendant problems of recycled recovery and contamination of the atmosphere. With the present day emphasis on both the conservation of petroleum hydrocarbon solvents and on environmental protection, the inks of this invention give an opportunity to both conserve hydrocarbons and protect the environment, since the result of drying the ink is harmless.

It is therefore an object of the present invention to provide a water-based ink which becomes irreversibly impervious to water when dry. Other objects will be apparent to those skilled in this art as the description proceeds.

It has now been discovered that an ink which becomes water insoluble upon drying can be produced in a water medium by using the ammonium salts of olefin/maleic anhydride copolymers or polyolefin/maleic anhydride copolymers in a water/diol solution together with a pigment or dyeing agent. The ammonium salts of such copolymers are easily prepared by adding the respective granulated copolymers to slightly excess amounts of stirred ammonium hydroxide solutions. Either olefin/maleic anhydride or polyolefin/maleic anhydride copolymers can be used. Mixtures of the two types of copolymers can be used. Both monoolefins and polyolefin/maleic anhydride copolymers are hereinafter described as "olefin" copolymers.

It is believed that the reactions which occur upon drying the ammonium copolymer salt alone as well as in the presence of diols can be illustrated as in the equations below. Equations 1 and 2 are included to show the formation of the copolymer and its salt. The products of Equations 4 to 6 inclusive are all water insoluble and obtained upon evaporation of the aqueous phase, followed by heating the product. Equation 6 represents the process by which the ink described is brought to a state of insolubility upon drying. This insolubilization occurs quite rapidly at room temperature. While polyolefins yield copolymers containing pendant unsaturation, monoolefins yield copolymers with no pendant unsaturation. Equation 7 illustrates the action of a monoolefin yielding a copolymer with no pendant group.

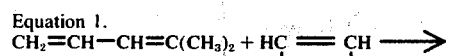
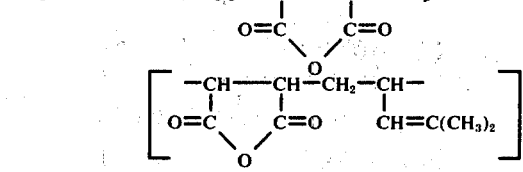

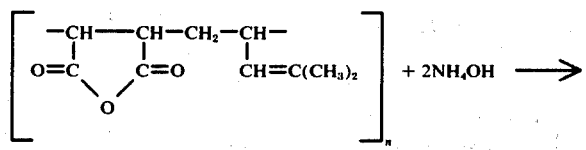

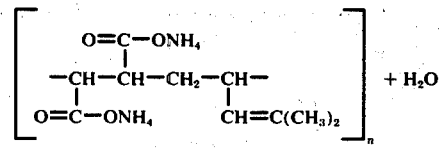

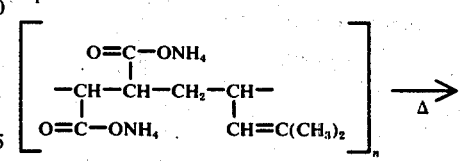

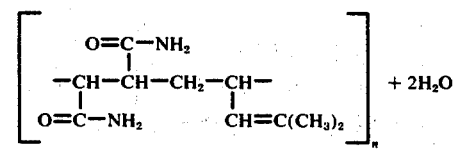

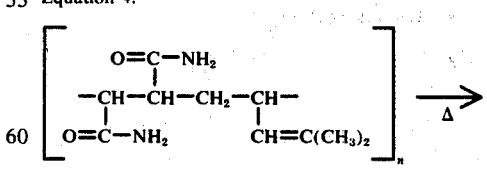

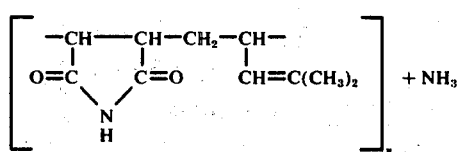

Equation 5.

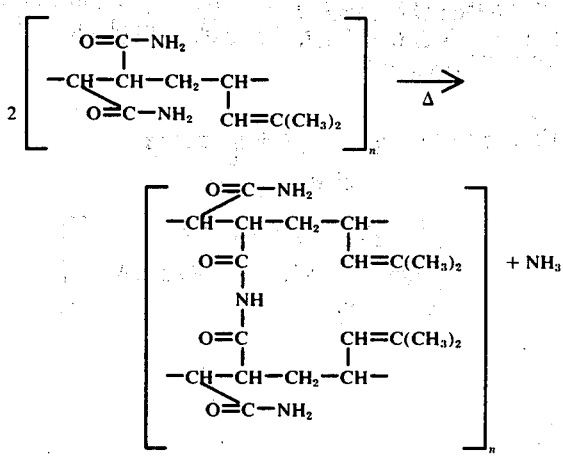

Equation 6.

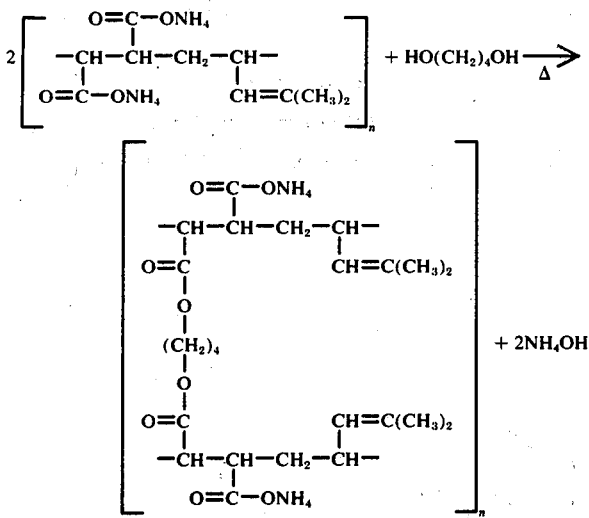

Equation 7.

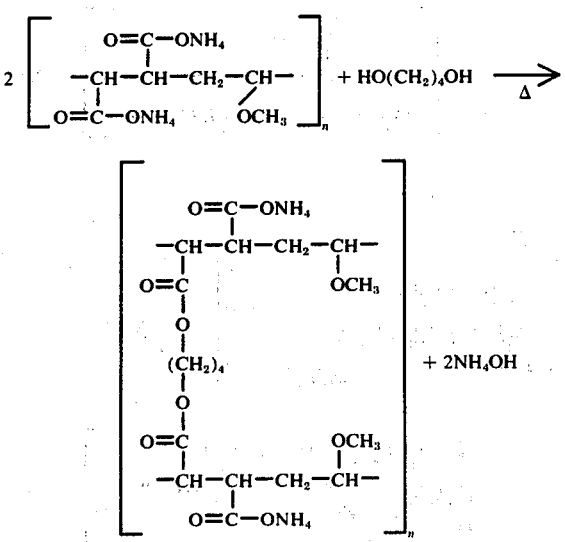

In these equations, $n$ is a number from 10 to 30.

The ratio of olefin/maleic anhydride ammonium salts to polyolefin/maleic anhydride ammonium salts can vary widely. The salts can be used either alone or in ratios ranging from 100 parts of the olefin ammonium salt to zero part polyolefin ammonium salt. Usually a total weight of about 100 parts by weight of the salts either alone or in mixtures will be used.

The ratio of water to diol can likewise vary. Normally from about 85 parts by weight of water to about 5 parts by weight of diol is used but from about 50 parts by weight of water to about 50 parts by weight of diol is preferred.

The ratio of coloring material or dyeing agent to the total solution weight varies with the particular material selected and the intensity of color desired. Normally from about 2 percent to 15 percent by weight of the total solution is used but more or less can be used to fulfill particular requirements.

When blended onto a surface the ink dries to form a water impervious bond. Normally the drying time at room temperature ranges from about 10 seconds to about 5 minutes, depending on the amount of ink transferred to the paper and the temperature used to dry the ink. The crosslinking continues to completeness indicated by imperviousness of the imprint to water. The imprint is usually immediately resistant to a dry smear test. The diols have an ability shared by their dihydric compositions to retain sufficient water in the thin film forming the imprint to allow crosslinking to occur and gradually cause insolubility at room temperatures. This ability to retain some water allows the imprint to dry without causing distortion of the paper surface. Higher or lower temperatures will affect the time needed to crosslink the copolymer to form a water impervious imprint. The crosslinking process is faster at elevated temperatures.

The water-based inks become irreversibly impervious to water when dry. The process comprises adding from about 25 to 45 parts by weight of an ammonium copolymer salt to 100 parts by weight of water to form a solution ranging from about 20 to about 31 percent by weight, preferably about 25 percent, then dissolving in said solution from about 5 to 130 parts by weight of a diol, preferably about 100 parts, stirring the mixture to form a homogeneous solution, and then thoroughly blending from about 2 to 15 percent by weight based on the total weight of the solution of a coloring material into said solution.

The process described can be carried out in a blending apparatus such as paint mills, Waring blenders and mullers.

Several tests were run upon completed water insoluble ink imprints. The tests were carried out using the following methods.

1. In order to provide for a standard method of transferring the ink, a Carter foamed rubber stamp pad was used. A 15 gram sample of ink formulation was uniformly worked into the pad and a test impression made on medium weight bond paper using a rubber stamp. Drying time and temperatures are given in Table 1.

2. The smear test consisted of moistening the impression with a wet finger tip for 3 to 5 seconds followed by a single light rub. If even the slightest amount of ink was disrupted it was considered a smear.

3. The total immersion test consisted of submerging the paper with the experimental ink impression obtained as described in test 1, in water for one minute after which the smear test (B) was applied. The impression was observed for any washing away or disruption of the ink. The wet test sample was spread on paper towels dry.

4. The wet sample from test 3 was pressed with a white blotter which was examined for ink transfer.

5. The degree of ink setting or insolubilization was determined by allowing the imprint to dry over varying periods of time at room temperature or at 120° C. with smear and total immersion tests made after each period of time.

Water-based inks such as these have a tendency to dry when used on stamp pads which are normally exposed to the air for long periods of time. It has been found that these pads containing this ink are conveniently restored to their original utility by simply moistening with a small amount of water. Imprints made from the reactivated ink pads possess the same desirable properties as those made from ink pads which had not been dried.

In order to enhance the lability of the ammonium copolymer salts it is apparently necessary to change their form from the bulk state in which they occur on the pads to a very thin film, i.e. the imprint, via a rubber stamp or roll. In the bulk state, the ammonium copolymer salts must be heated in order to become water insoluble, while crosslinking in the film requires no additional heat above room temperatures.

The invention is more concretely described with reference to the examples below, in which parts and percentages are by weight unless otherwise specified.

EXAMPLE I

A (4-methyl-1,3-pentadiene/maleic anhydride) copolymer was prepared by adding 360 grams of copolymer which had been previously granulated through a one millimeter mesh screen to 500 grams of rapidly stirred, concentrated (28–30% $NH_3$), ammonium hydroxide solution. The rapid addition of the copolymer allowed a homogeneous slurry to form which was then allowed to stand overnight to form a taffy-like solution. The solution was slightly ammoniacal and contained 58.3 percent solids. One hundred cc's of water was added to lower the viscosity of the ultimate solution which then contained about 50 percent solids.

EXAMPLE II

Ten one-tenth gram samples of dried ammonium copolymer salt, prepared as described in Example I, were placed into glass vials. The vials were placed into a 120° C. oven and allowed 5 minutes warm-up time. The samples were removed according to the following schedule, shaken with 10 cubic centimeters of water and observed for the formation and stability of a foam.

Little difference was found between Samples 0 through 6. Sample 7 formed a slightly more stable foam whereas the foam from Sample 8 outlasted that formed by Sample 7 by about an hour. The complete insolubility of Sample 9 was preceded by a noticeable increase in the amount and stability of the foam formed.

The olefin portion of the olefin/maleic anhydride copolymer can vary widely. The most preferred olefins are those selected from the group consisting of cis-piperylene, 4-methyl-1,3-pentadiene, methyl vinyl ether and 2,4-dimethyl-1-heptene.

The diol portion of the water/diol solution can also vary widely. The most preferred diols are those selected from the group consisting of 1,4-butanediol, 1,5-pentanediol, ethylene glycol, diethylene glycol, ethylene glycol and the monoethyl ether of ethylene glycol, and ethylene glycol and the monoethyl ether of diethylene glycol.

The coloring composition of the ink can also vary widely. The most preferred coloring materials are those selected from the group consisting of carbon black of the lamp black type, phthalocyanines such as monastral blue and monastral green (made by Imperial Chemical Industries) and commercially available azo pigments such as toluidine red, para red and Hansa yellow G (made by General Analine and Film Company).

Inks were prepared using 1,4-butanediol as the basic formulation against which all other experimental mixtures were rated. The recipe used was 34.5 grams of 4-methyl-1,3-pentadiene/maleic anhydride copolymer, 103.5 grams of water (25% solution), 103.5 grams of 1,4-butanediol and 34.5 grams of Super Jet lamp black (SJLB). The mixing procedure was carried out in a Waring blender in lieu of a 3-roll paint mill because of laboratory size batches. The procedure was as follows:

1. The ingredients were stirred to form a homogeneous solution.
2. With the Waring blender running at a moderate speed, the lamp black was quickly added in one portion. Mixing was continued at a higher speed to complete homogeniety. In the case of pasty mixtures, the mixing was stopped every 10 minutes and agitated with a spatula to eliminate lack of mixing at the periphery of the mixer blades. This formulation produced a buttery paste having no tack or tendency to flow.

Subsequent inks were also prepared for comparative testing using the following formulation.

EXAMPLE III 1,5-Pentanediol was substituted for 1,4-butanediol and the procedure was carried out exactly as described above. The mixture formed a paste as described in the previous examples.

Table 1

| Sample No. | Heating at 120° C. (min.) | Time to Dissolve (min) |
| --- | --- | --- |
| 0 | 0 | 3 to 4 |
| 1 | 5 | 4 |
| 2 | 10 | 7 |
| 3 | 15 | 9 |
| 4 | 20 | 10 |
| 5 | 30 | 10 |
| 6 | 40 | 22 |
| 7 | 60 | 25 |
| 8 | 120 | 35 |
| 9 | 720 | completely insoluble |

EXAMPLE IV

Ethylene glycol was substituted for the 1,4-butanediol and the procedure was carried out as described above. The mixture produced a fluid ink having a viscosity of 1080 centipoises (cps).

EXAMPLE V

Diethylene glycol was substituted for the 1,4-butanediol of the first example. Again the mixture formed a fluid ink having a viscosity of 1420 cps.

EXAMPLE VI

One hundred thirty-eight grams of the 25 percent copolymer solution was mixed with 94.3 grams of ethylene glycol and the monoethyl ether of ethylene glycol, 9.2 grams of ethylene glycol, and 34.5 grams of SJLB lamp black. The procedure was carried out exactly as described above, resulting in a paste.

EXAMPLE VII

One hundred thirty-eight grams of the 25 percent copolymer solution was added to 94.3 grams of the monoethyl ether of diethylene glycol along with 9.2 grams of ethylene glycol and 34.5 grams of the lamp black. The procedure was carried out exactly as described above, resulting in a paste.

EXAMPLE VIII

A 2,4-dimethyl-1-heptene/maleic anhydride copolymer was converted to its ammonium salt by adding it with stirring to a stoichiometric (2% excess) amount of ammonium hydroxide and then diluting to contain 25 percent solids. This copolymer was used in place of the standard copolymer along with 103.5 grams of 1,4-butanediol and 34.5 grams of SJLB lamp black. The recipe was mixed in the manner described above to form a buttery paste.

EXAMPLE IX

In the manner described for the copolymer above, a cis-piperylene/maleic anhydride copolymer was converted to its ammonium salt by stirring 26.3 grams with 19.2 grams of concentrated $NH_4OH$ (57.64% $NH_4OH$) and 94 grams of water in a Waring blender to give 138 grams of ammonium salt solution. This solution was substituted for the standard copolymer and added to the usual recipe to form a soft buttery paste.

The inks prepared as described above were tested for smearing and washability with the results noted in Table 2. The standard formulation containing 37.4 percent water was diluted to form samples containing 50 and 75 percent water. The test results were as shown in Table 3.

Table 2

| Ammonium Copolymer Salt | Diol Plus Water | Viscosity | Smear Test | | Total Immersion Test | |
|---|---|---|---|---|---|---|
| | | | No Smear After Mins/RT° C. | No Smear After Mins/120° C. | No Smear After Mins/RT° C. | No Wash After Mins/120° C. |
| 4-MPD/MA (ACS)[1] | ethylene glycol | 1080 cps | 30 | 1–5 | 5 | 1–5 |
| 4-MPD/MA | 1,4-butanediol | Paste | 15 | 1–5 | 5 | 1–5 |
| 4-MPD/MA | 1,5-pentanediol | Paste | 24 hrs. | 15 | 10 | 5 |
| 4-MPD/MA | diethyleneglycol | 1420 cps | 15 | 1–5 | 5 | 1–5 |
| 4-MPD/MA | ethylene glycol[5] | Paste | 24 hrs. | 5–10 | 5–10 | 5 |
| 4-MPD/MA | ethylene glycol[6] | Paste | 24 hrs. | 5–10 | 5–10 | 5 |
| 4-MPD/MA | ethylene glycol[6] | Grainy | — | — | — | — |
| Cis-Pip/MA[2] | 1,4-butanediol | Paste | 48 hrs. | 10 | 2 hrs | 10 |
| 2,4-DMH/MA[3] | 1,4-butanediol | Paste | 15 | 1–5 | 5 | 1–5 |
| MVE/MA[4] | 1,4-butanediol | Paste | 48 hrs. | 5–10 | 2 hrs | 5 |

[1]4-methyl-1,3-pentadiene/maleic anhydride.
[2]cis-piperylene/maleic anhydride.
[3]2,4-dimethyl-1-heptene/maleic anhydride.
[4]methyl vinyl ether/maleic anhydride.
[5]dissolved in the monoethylether of ethylene glycol.
[6]dissolved in the monoethylether of diethylene glycol.

Table 3

| Dilution % | $H_2O$ % | 1,4-butanediol % | Copolymer % | SJLB Lampblack % | No Smear After Mins/RT° C. | No Smear After Mins/120° C. | No Wash After Mins/RT° C. | No Wash After Mins/120° C. |
|---|---|---|---|---|---|---|---|---|
| 37 | 37.4 | 37.4 | 12.5 | 12.5 | 30 | 1 | 5 | 1 |
| 60 | 50 | 30 | 10 | 10 | 3 hrs | 1 | 10 | 1 |
| 75 | 75 | 15 | 5 | 5 | 3 hrs | 1 | 10 | 1 |

While certain representative embodiments and details have been shown for the purpose of illustrating the invention, it will be apparent to those skilled in this art that various changes and modifications may be made therein without departing from the spirit or scope of the invention.

What is claimed is:

1. A water-based ink comprising a solution of the ammonium salt of a 4-methyl-1,3-pentadiene/maleic anhydride copolymer in a water/diol solution together with a coloring material to form an ink which becomes irreversibly impervious to water when dry, in which the diol is at least one material selected from the group consisting of 1,4-butanediol, 1,5-pentanediol, ethylene glycol, diethylene glycol, the monoethyl ether of ethylene glycol and the monoethyl ether of diethylene glycol, in which the copolymer is employed from about 25 to 45 parts by weight per 100 parts by weight of water and in which the diol is employed from about 5 to about 130 parts by weight of said copolymer plus water.

2. A composition as described in claim 1 wherein the coloring material is selected from the group consisting of organic pigments of the phthalocyanine type, carbon black of the lamp black type and azo pigments.

3. A composition as described in claim 1 wherein the weight ratio of water to diol is 1 to 1.

4. A composition as described in claim 1 wherein the amount of coloring material in the ink solution is from about 2 percent to about 15 percent by weight of the solution.

5. A process for the preparation of a water based ink which becomes irreversibly impervious to water when dry, comprising adding from about 25 to about 45 parts by weight of an ammonium salt of 4-methyl-1,3-pentadiene/maleic anhydride to 100 parts by weight of water to form a solution ranging from 20 to 31 percent by weight, then dissolving in said solution from about 5 to 130 parts by weight of at least one diol selected from the group consisting of 1,4-butanediol, 1,5-pentanediol, ethylene glycol, diethylene glycol, the monoethyl ether of ethylene glycol and the monoethyl ether of diethylene glycol, stirring the mixture to form a homogeneous solution and then thoroughly blending into said solution from about 2 to 15 percent by weight based on the total weight of solution of a coloring material.

6. The process according to claim 5 in which the coloring material is selected from the group consisting of organic pigments of the phthallocyanine type, carbon black of the lamp black type and azo pigments.

7. The process according to claim 5 in which the ratio of water to diol is 1 to 1.

* * * * *